Oct. 15, 1946.  J. A. GALE  2,409,203
SHEET SLITTING DEVICE
Filed April 26, 1945  2 Sheets-Sheet 1
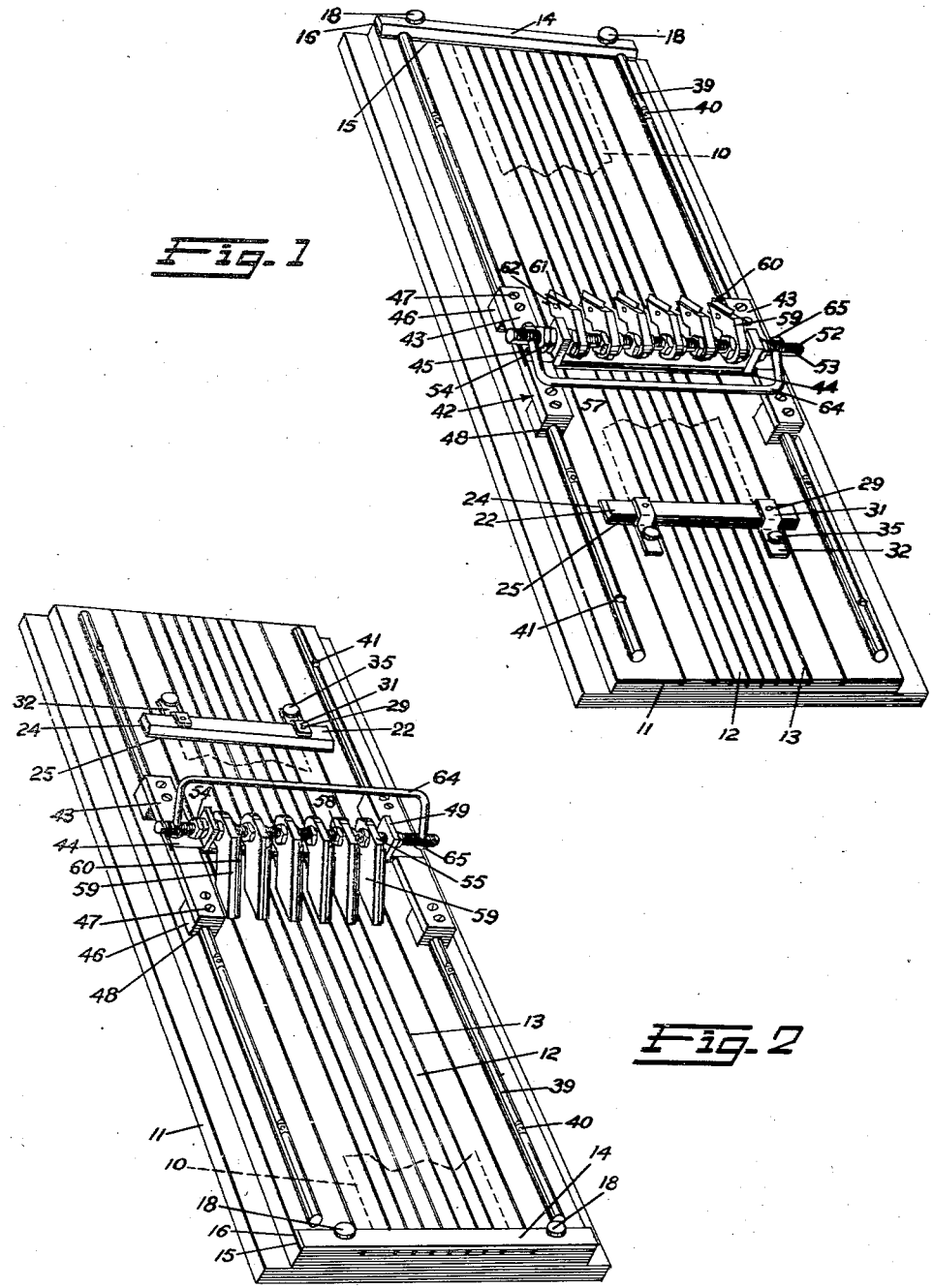
INVENTOR.
James A. Gale
BY
Ralph L. Chappell
ATTORNEY Oct. 15, 1946.  J. A. GALE  2,409,203
SHEET SLITTING DEVICE
Filed April 26, 1945  2 Sheets-Sheet 2
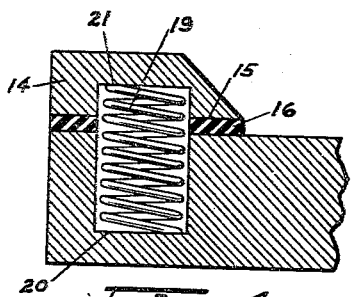
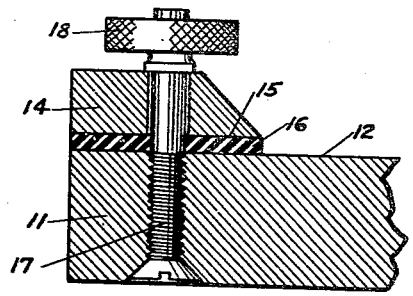
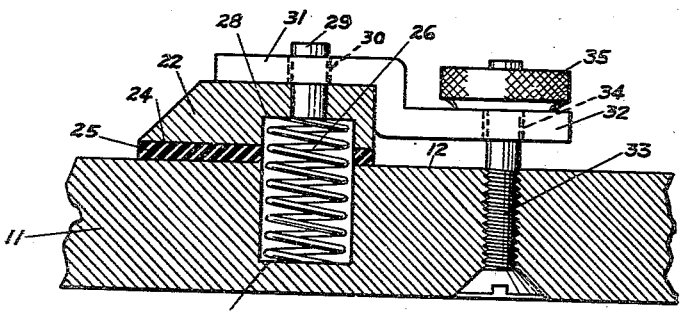
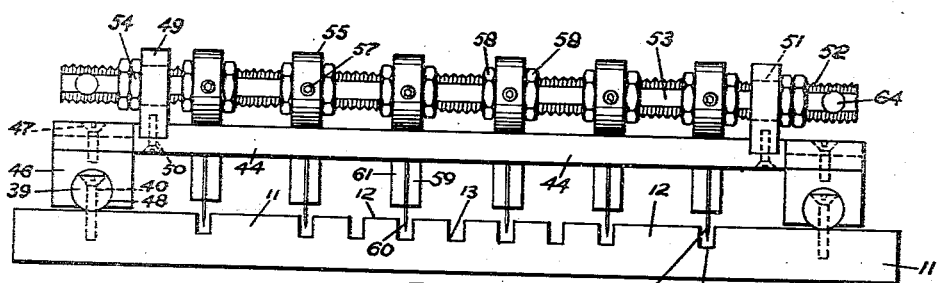
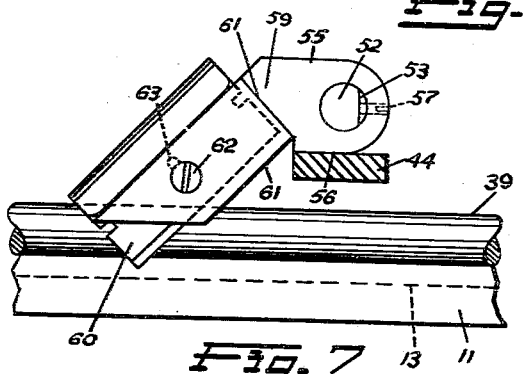
INVENTOR.
James A. Gale
BY
Ralph L Chappell
ATTORNEY

Patented Oct. 15, 1946

2,409,203

UNITED STATES PATENT OFFICE 2,409,203

SHEET SLITTING DEVICE

James A. Gale, New York, N. Y.

Application April 26, 1945, Serial No. 590,445

3 Claims. (Cl. 164—73)

(Granted under the act of March 3, 1883, as amended April 30, 1928; 370 O. G. 757)

This invention concerns an apparatus for slitting sheet material and particularly the invention concerns an apparatus for slitting sheets of cellulosic material, synthetic resin or plastic material into long narrow strips.

In determining the physical characteristics of thin sheet material such as cellulosic film, two important tests are for tensile strength and elongation. For the purpose of making such tests it is found convenient to use specimens in the form of relatively long narrow strips and it is customary to cut specimens of such shape from larger sheets of material by slitting the sheets.

In performing tests to determine tensile strength and elongation on sheet material it is necessary that the results of the tests be accurate and give an indication of true value. To achieve this end it is customary to run tests on a number of specimens and compute an average of the results obtained in order that slight deviations from true value in individual specimens will compensate each other and not show up in the computed average.

It is further necessary in performing such tests that the results secured shall be reproducible, that is, that the results secured from any sample shall be consistent with the results secured from any other sample and that variations in results from different specimens shall be small.

Cellulosic materials such as photographic film inherently have high tensile strength and low tearing strength. In performing tension and elongation tests it has been found that rupture of the specimen is caused by a combination of failure due to tension and failure due to tearing. In order that the tearing effect may be kept at a minimum and that true tensile strength and elongation values may be obtained it is necessary that the specimens be cut in such a manner that the edges are free from nicks, cuts or other imperfections since these are incipient points of tear. It can therefore be seen that the value of tensile strength and elongation obtained in such tests is to a large measure affected by the apparatus used in cutting the test specimens from a larger sheet and the condition of the edges of the test specimen after cutting. Experience has proven and microscopic examination of the edges of specimens cut by various devices substantiate that the use of an extremely sharp cutting edge such as a razorblade operating in free air gives the cleanest cut and one which is for practical purposes free from nicks or rough spots.

Previous methods used for the preparation of test specimens consisted of laying the sheet of material to be slit upon a bedplate of material, such as linoleum, and manually cutting it with a knife blade or razor. Such methods have proven inadequate since the edges of the specimen cut in this manner were nicked and otherwise imperfect so that the tensile strength and elongation values obtained upon testing such specimens were completely unreliable, inaccurate and not reproducible.

This invention provides an apparatus in which a sheet of material, such as cellulosic film, is slit into relatively long narrow specimens with a plurality of razorblades operating in free air. The apparatus provides a slotted bedplate having clamps to hold the sheet of material in position over the slots while being cut by series of sharp cutting tools that extend into the slots and that are supported on a carriage which slides over the bedplate. It is possible by using the present invention to slit a sheet of material with precision and insure that the specimens produced have clean edges, which are for practical purposes, free from nicks or other imperfections and which give true values of tensile strength and elongation when tested. Values of tensile strength made on specimens cut on the apparatus forming the subject matter of this invention are higher than for specimens produced by other apparatus. Elongation at rupture of 25 to 30% have been obtained on specimens of material produced by the apparatus of this invention, which material when tested by specimens produced on other apparatus had elongation values so low as to be impossible of measurement.

Values of tensile strength and elongation secured from samples produced by the apparatus of this invention are reliable, accurate and reproducible.

An object of this invention is to provide an apparatus for slitting sheets into relatively long narrow strips.

A further object is to provide an apparatus for slitting sheet material into specimen strips having edges which are clean and unbroken and which are free from nicks or other imperfections.

A further object is to provide an apparatus for slitting sheet material into specimen strips which give a true indication of tensile strength and elongation when tested and which are free from imperfections causing distortions of test values.

Further objects and advantages of this invention, as well as its construction, arrangement and operation, will be apparent from the following description and claims in connection with the accompanying drawings in which:

Figure 1 is a perspective view of a preferred form of the invention.

Figure 2 is a perspective view similar to Figure 1 but taken from a point of view 180° removed from the view point of Figure 1.

Figure 3 is a detailed view showing in section the method of mounting one of the clamps of this invention.

Figure 4 is a detailed view showing in section the spring cushion for the clamp of Figure 3.

Figure 5 is a detailed view showing in section the mounting for the second clamp of this invention.

Figure 6 is a fragmentary view in elevation showing the construction for mounting the carriage of this invention upon its baseboard.

Figure 7 is a fragmentary view showing the construction for mounting a cutting tool in the carriage.

Referring to the drawings in detail and with particular reference to Figures 1 and 2, there is illustrated a bedplate 11 having a working surface 12 which is preferably flat and rectangular in shape and upon which is positioned a sheet of material 10 (shown in phantom lines) to be slit into strips. Bedplate 11 may be made of any suitable material such as Bakelite. A series of parallel slots 13 are disposed longitudinally in working surface 12 and are spaced apart a width corresponding to the width of the specimen strips which it is desired to cut. Slots 13 are of a depth sufficient to accommodate the depending portion of cutting tools which will be hereinafter described.

A bar clamp 14 is provided at one end of working surface 12 and is disposed transversely to slots 13. Bar clamp 14 has a lower face 15 which is flat in contour and located in opposed relation to working surface 12. Fastened to face 15 in any suitable manner is a friction strip 16 which may be made of any suitable material such as rubber. Referring to Figure 3 it will be seen that bar clamp 14 is adjustably secured with respect to bedplate 11 by means of a pair of screws 17 each of which is threaded into the bedplate and has an upwardly extending portion which extends through an opening in bar clamp 14. A handnut 18 on each screw 17 secures bar clamp 14 in place and nuts 18 may be tightened to actuate bar clamp 14 toward working surface 12 or may be loosened to allow withdrawal of bar clamp 14 away from working surface 12. Referring to Figure 4, it will be seen that bar clamp 14 is cushioned upon a pair of springs 19 which constantly urge bar clamp 14 away from working surface 12 in order that one edge of a piece of material 10 to be slit may be inserted thereunder. Each spring 19 reacts at one end within a recess 20 in bedplate 11 and at its other end reacts within a recess 21 in face 15 of bar clamp 14.

Arranged near the opposite end of working surface 12 is a second bar clamp 22 arranged transversely to slots 13. Bar clamp 22 has a lower face 24 which is flat and located in opposed relation to working surface 12. A friction strip 25 of any suitable material such as rubber is secured in any suitable manner to surface 24. Referring to Figure 5, it will be seen that bar clamp 22 is cushioned upon a pair of springs 26 which constantly urge bar clamp 22 away from working surface 12 in order that one edge of a piece of material 10 may be inserted thereunder. Each spring 26 reacts at one end in a recess 27 in bedplate 11 and reacts at its other end in a recess 28 in face 24 of bar clamp 22. Mounted in the upper surface of bar clamp 22 and extending upwardly therefrom, are a pair of pins 29 each of which is adapted to extend through a slot 30 in a bracket 31. Each bracket 31 is provided with a downwardly offset portion 32 which is adjustably secured with respect to bedplate 11 by means of a screw 33. Each screw 33 is threaded into bedplate 11 and extends upwardly through slot 34 in offset 32. A pair of hand nuts 35 one on each screw 33 is provided to adjustably secure brackets 31 with respect to bedplate 11. Handnuts 35 may be tightened to urge brackets 31 and bar clamp 22 toward working surface 12 or may be loosened to allow movement of brackets 31 and bar clamp 22 away from working surface 12.

Provided along the sides of working surface 12 is a pair of guide rails 39 which are preferably cylindrical in shape and which are disposed parallel to slots 13, being secured to bedplate 11 by screws 40. The heads of screws 40 are countersunk into the top of rails 39 except for the end screws in each rail 39 adjacent bar clamp 22 which protrude above the top of rails 39 to form stops 41 for a sliding carriage 42.

Carriage 42 is mounted for sliding movement on guide rails 39 and has an H-shaped frame consisting of parallel legs 43 and a crossbar 44 which is countersunk at its ends into the top of legs 43 and secured in place by screws 45. Each leg 43 at its extremities is provided with a pair of slide blocks 46 secured to its under surface by screws 47. Slide blocks 46 on each leg are provided with aligned bores 48 whereby the slide blocks and carriage 42 may be mounted upon guide rails 39 for sliding motion. Slide blocks 46 are constructed to have a snug fit with respect to guide rails 39 whereby easy sliding movement of carriage 42 upon guide rails 39 is permitted while lateral movement transversely of slots 13 is prevented.

With reference to Figure 6, spaced vertical extending lugs 49 are countersunk into the top surface of crossbar 44 and secured in place by means of screws 50. Lugs 49 are provided with aligned bores 51 through which extends a shaft 52. Shaft 52 is threaded throughout its entire length and is provided with a flat side 53 for a purpose hereinafter described. A pair of locknuts 54 are threaded on shaft 52 against the outboard surface of each of lugs 49 serving to lock shaft 52 against lateral movement relative to carriage 42.

Mounted upon shaft 52 is a series of spaced fingers 55 each having a bottom surface 56 (Figure 7) and each being secured against rotation by a set screw 57 threaded against the flat side 53 of shaft 52. A pair of locknuts 58 to hold each finger 55 against lateral movement is threaded on shaft 52 with one locknut 58 on each side of a finger 55. Each finger 55 is provided with a portion 59 which serves as a tool holder for a cutting tool 60 which may be of any suitable construction and may, if desired, be in the form of a razorblade as illustrated in Figure 7. A locking plate 61 is mounted on each tool holder for securing cutting tool 60 in position and a lock screw 62 serves to clamp locking plate 61 and tool 60 in position. A slot 63 is provided in cutting tool 60 whereby adjustment of the cutting tool relative to tool holder 59 may be made. Fingers 57 are spaced apart a distance equivalent to the width of the strips which it is desired to cut from the sheet of material. Fingers 55 are all secured in the same angular position on shaft 52 so that cutting tools 60 all occupy the same angular position relative to shaft 52.

A U-shaped handle 64 is mounted with its ends projecting through shaft 52 and is secured in place on shaft 52 by means of nuts 65.

Operation of the apparatus is as follows. Initial adjustment of fingers 55 is made by loosening locknuts 58 and set screws 57 and then positioning fingers 55 laterally upon shaft 54 so that each cutting tool 60 is centrally aligned with a slot 13 and the cutting tools are spaced apart a distance corresponding to the width of the strips which it is desired to cut from the sheet of material. Fingers 55 are then locked upon shaft 52 by tightening set screws 57 and locknuts 58.

A sheet of material to be slit is loaded into the machine as follows. Handle 64 is depressed to rotate shaft 52 so that cutting tools 60 are withdrawn from slots 13, and carriage 42 is reciprocated on guide rails 39 to the end of working surface 12 adjacent clamp 22 and against stop screws 41. Working surface 12 between clamps 14 and 22 is thus left clear. Clamp 14 is loosened by unscrewing handnuts 18, and clamp 22 is loosened by unscrewing handnuts 35. A sheet of material to be slit is then laid on working surface 12 of bedplate 11 with the ends thereof under clamps 14 and 22. Clamp 14 is then secured by tightening handnuts 18 and clamp 22 is secured by tightening handnuts 35 to clamp the sheet of material in place for slitting.

With handle 64 still depressed, carriage 42 is reciprocated on guide rails 39 to the end of working surface 12 adjacent clamp 14 and clamp 14 will serve as a stop for carriage 42 when the latter comes into abutment therewith. Handle 64 is next raised to rotate shaft 52 and depress cutting tools 60 which will puncture the sheet of material and extend into slots 13. Carriage 42 is then reciprocated on guide rails 39 toward clamp 22 whereby tools 60 slit the sheet of material into multiple strips. Handle 64 is then depressed to raise cutting tools 60 and is reciprocated to the end of bedplate 11 against stop screws 41 adjacent clamp 22. Clamps 14 and 22 are then loosened as above described and the sheet of material in slit condition removed from the machine.

The limits of throw for handle 64 are determined by contact of handle 64 with carriage legs 43 on the downward stroke, and abutment of finger faces 56 (Figure 7) with carriage crossbar 44 on the upward stroke.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A sheet slitting device comprising a bedplate having a flat working surface adapted to have a sheet of material to be slit imposed thereon, said working surface defining a plurality of parallel slots, a pair of spaced clamping bars arranged transversely of said slots, said bars having friction surfaces opposed to said working surface, resilient means for urging said bars away from said working surface whereby opposite edges of a sheet of material may be inserted between said working surface and said friction surfaces, means for clamping said bars against said working surface to secure the sheet thereon, guide rails on said bedplate parallel to said slots, a carriage mounted on said rails for reciprocation in a line parallel to said slots, a shaft rotatably mounted on said carriage and disposed transversely of said slots, spaced fingers rigidly secured to said shaft, cutting tools secured to said fingers, and means for adjusting said fingers on said shaft whereby said tools may be aligned with said slots, said shaft being arranged for rotation into cutting position whereby said tools are depressed in unison into said slots with the cutting edges thereof disposed to slit the sheet of material and being further arranged for rotation in unison into inoperative position whereby said tools are withdrawn from said slots.

2. A sheet slitting device comprising a bedplate having a flat working surface adapted to have a sheet of material to be slit imposed thereon, said working surface defining a plurality of parallel slots, means for securing a sheet to be slit upon said working surface, guide rails on said bedplate parallel to said slots, a carriage mounted on said rails for reciprocation in a line parallel to said slots, a shaft rotatably mounted on said carriage and disposed transversely of said slots, spaced fingers rigidly secured to said shaft, cutting tools secured to said fingers, and means for adjusting said fingers on said shaft whereby said tools may be aligned with said slots, said shaft being arranged for rotation into cutting position whereby said tools are depressed in unison into said slots with the cutting edges thereof disposed to slit the sheet of material and being further arranged for rotation in unison into inoperative position whereby said tools are withdrawn from said slots.

3. A sheet slitting device comprising a bedplate having a flat working surface adapted to have a sheet of material to be slit imposed thereon, said working surface defining a plurality of parallel slots, a pair of spaced clamping bars arranged transversely of said slots, said bars having friction surfaces opposed to said working surface, resilient means for urging said bars away from said working surface whereby opposite edges of a sheet of material may be inserted between said working surface and said friction surfaces, means for clamping said bars against said working surface to secure the sheet thereon, guide rails on said bedplate parallel to said slots, a carriage mounted on said rails for reciprocation in a line parallel to said slots, said carriage having a portion extending transversely of said slots, spaced fingers supported on said transverse portion, cutting tools secured to said fingers, and means for adjusting said fingers on said transverse portion whereby said tools may be aligned with said slots, and means for moving said tools in unison into cutting position with the cutting edges thereof disposed to slit in said working surface a sheet of material, said means being arranged for moving said tools in unison into inoperative position with the cutting edges thereof withdrawn from the working surface.

JAMES A. GALE.